(12) United States Patent
Sibert

(10) Patent No.: US 7,845,293 B1
(45) Date of Patent: Dec. 7, 2010

(54) APPARATUS AND METHOD FOR FORMING HOLES AND FOR PLACING MATERIALS INTO SUB-SURFACE

(76) Inventor: James E. Sibert, 524 N. Manus Dr., Dallas, TX (US) 75224

( * ) Notice: Subject to any disclaimer, the term of this patent is extended or adjusted under 35 U.S.C. 154(b) by 0 days.

(21) Appl. No.: 12/645,600

(22) Filed: Dec. 23, 2009

(51) Int. Cl.
*A01C 23/00* (2006.01)

(52) U.S. Cl. .................. 111/118; 111/127; 111/129; 111/901; 111/915; 111/917; 111/922

(58) Field of Classification Search .......... 111/89, 111/118–120, 127–129, 7.1–7.4, 901, 902, 111/915, 917, 922, 925
See application file for complete search history.

(56) References Cited

U.S. PATENT DOCUMENTS

| | | | |
|---|---|---|---|
| 2,988,025 A | 6/1961 | Johnston | |
| 3,012,526 A | 12/1961 | Baldwin et al. | |
| 3,815,525 A | 6/1974 | Kainson et al. | |
| 3,875,876 A | 4/1975 | Pustovoit et al. | |
| 4,009,666 A | 3/1977 | Russell et al. | |
| 4,481,894 A | 11/1984 | Brenn | |
| 4,624,193 A | 11/1986 | Johnston | |
| 4,805,088 A | 2/1989 | Cross et al. | |
| 4,807,544 A | 2/1989 | Cross et al. | |
| 4,872,411 A | 10/1989 | Nagy | |
| 4,907,516 A | 3/1990 | Rogers | |
| 5,101,745 A | 4/1992 | Podevels et al. | |
| 5,207,168 A | 5/1993 | Comer | |
| 5,370,069 A | 12/1994 | Monroe | |
| 5,487,346 A | 1/1996 | Taylor | |
| 5,503,091 A | 4/1996 | Foster et al. | |
| 5,605,105 A | 2/1997 | Clark et al. | |
| 5,983,559 A | 11/1999 | Manabe | |
| 6,634,435 B2 | 10/2003 | Saeger | |
| 6,892,657 B2 | 5/2005 | Engelke et al. | |

*Primary Examiner*—Christopher J. Novosad
(74) *Attorney, Agent, or Firm*—Michael A. Rahman, Esq.; Storm LLP

(57) ABSTRACT

An apparatus for forming holes in ground and for placing hygroscopic particles into the holes is disclosed. The apparatus includes a first chamber configured to hold a liquid and a second chamber configured to hold the hygroscopic particles. A first pressure mechanism maintains the liquid in the first chamber at a first pressure level, and a second pressure mechanism maintains the hygroscopic particles in the second chamber at a second pressure level. A first valve is operable during a first time period to regulate the delivery of the liquid into a third chamber through a first opening. A second opening is configured to direct jets of liquid from the third chamber during the first time period to form holes in the ground. A second valve is operable during a second time period to regulate the delivery of the hygroscopic particles to the third chamber. The first valve is operable during a third time period to regulate the delivery of the liquid to the third chamber through the first opening causing jets of the hygroscopic particles to be directed through the second opening into the holes.

10 Claims, 3 Drawing Sheets

APPARATUS AND METHOD FOR FORMING HOLES AND FOR PLACING MATERIALS INTO SUB-SURFACE

FIELD OF THE INVENTION

The invention generally relates to the field of soil maintenance, and more particularly to an apparatus and method for forming holes in soil and for placing materials into the holes in the soil.

BACKGROUND OF THE INVENTION

Hygroscopic materials have been used in terrains to regulate moisture. In agricultural, turf maintenance and other applications, hygroscopic materials have been introduced to absorb rain and irrigation water. The absorbed water is released by the materials over an extended period of time.

Tilling equipments are generally used to plow soil to deliver the materials sub-surface. However, tilling causes soil erosion, destroys turf, and sub-surface disturbances damage in ground irrigation. In golf greens and other areas, tilling prevents use of the land for a significant amount of time.

High pressure jets, often utilizing venturi effects, have been used to deliver the materials into the soil. While, such high pressure jets allow delivery of the materials into the sub-surface without tilling, existing high pressure jets do not precisely control the amount of materials delivered.

SUMMARY OF THE EMBODIMENTS

In one embodiment, an apparatus for forming holes in ground and for placing hygroscopic particles into the holes includes a first chamber configured to hold a liquid and a second chamber configured to hold the hygroscopic particles. A first pressure mechanism is operable to maintain the liquid in the first chamber at a first pressure level. A second pressure mechanism is operable to maintain the hygroscopic particles in the second chamber at a second pressure level.

A first valve is operable during a first time period to regulate the delivery of the liquid into a third chamber through a first opening. A second opening is configured to direct jets of liquid from the third chamber during the first time period to form holes in the ground. A second valve is operable during a second time period to regulate the delivery of the hygroscopic particles to the chamber. The first valve is operable during a third time period to regulate the delivery of the liquid to the third chamber through the first opening, causing jets of the hygroscopic particles to be directed through the second opening into the holes The apparatus includes a control system configured to receive a distance information and in response operable to cause the first valve to regulate the delivery of the liquid into the third chamber. The control system is configured to receive distance information and in response operable to cause the second valve to regulate the delivery of the hygroscopic particles into the third chamber. The control system includes a programmable logic controller operable responsive to the distance information to generate first and second control signals to control of the respective first and second valves.

BRIEF DESCRIPTION OF THE DRAWINGS

For a more complete understanding of the features, example embodiments and possible advantages of the present invention, reference is now made to the detailed description of the invention along with the accompanying figures and in which.

DETAILED DESCRIPTION OF THE INVENTION

The embodiments of the invention disclosed herein generally relate to an apparatus and method for introducing hygroscopic substances into sub-surface using high pressure jets that cut through soil and carry the hygroscopic substances down to a desired depth. More specifically, the embodiments of the invention relate to an apparatus and method for introducing hygroscopic substances like Polyaerylamide (P4) into sub-surface without plowing the soil. The hygroscopic substances hydrate the soil by releasing water over an extended period of time, thus maintaining a desired moisture level in the soil over an extended period of time. The embodiments of the invention may be used, for example, in agricultural lands, residential lawns and golf courses.

Figure 1:
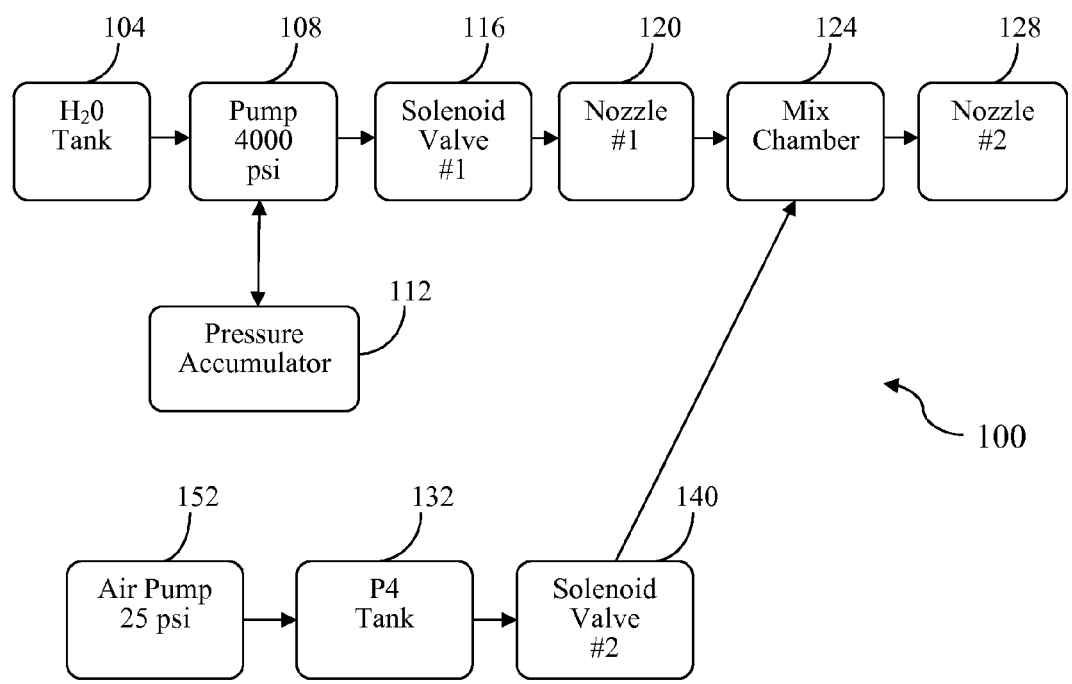
FIG. 1 is a block diagram of an apparatus for forming holes in ground and for directing hygroscopic particles into the holes in accordance with one embodiment.
Figure 2:
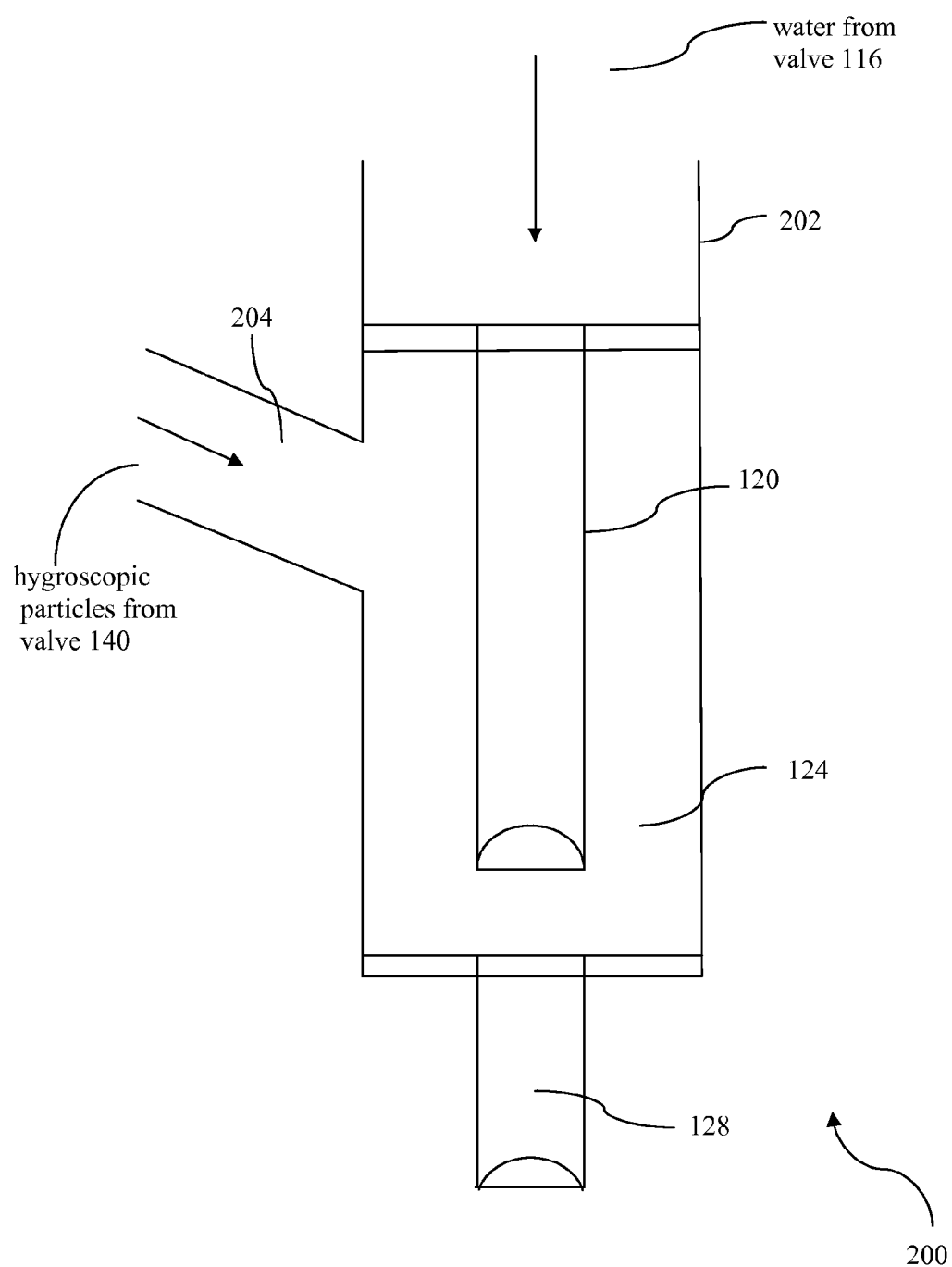
FIG. 2 illustrates a cylindrical assembly having a chamber.
Figure 3:
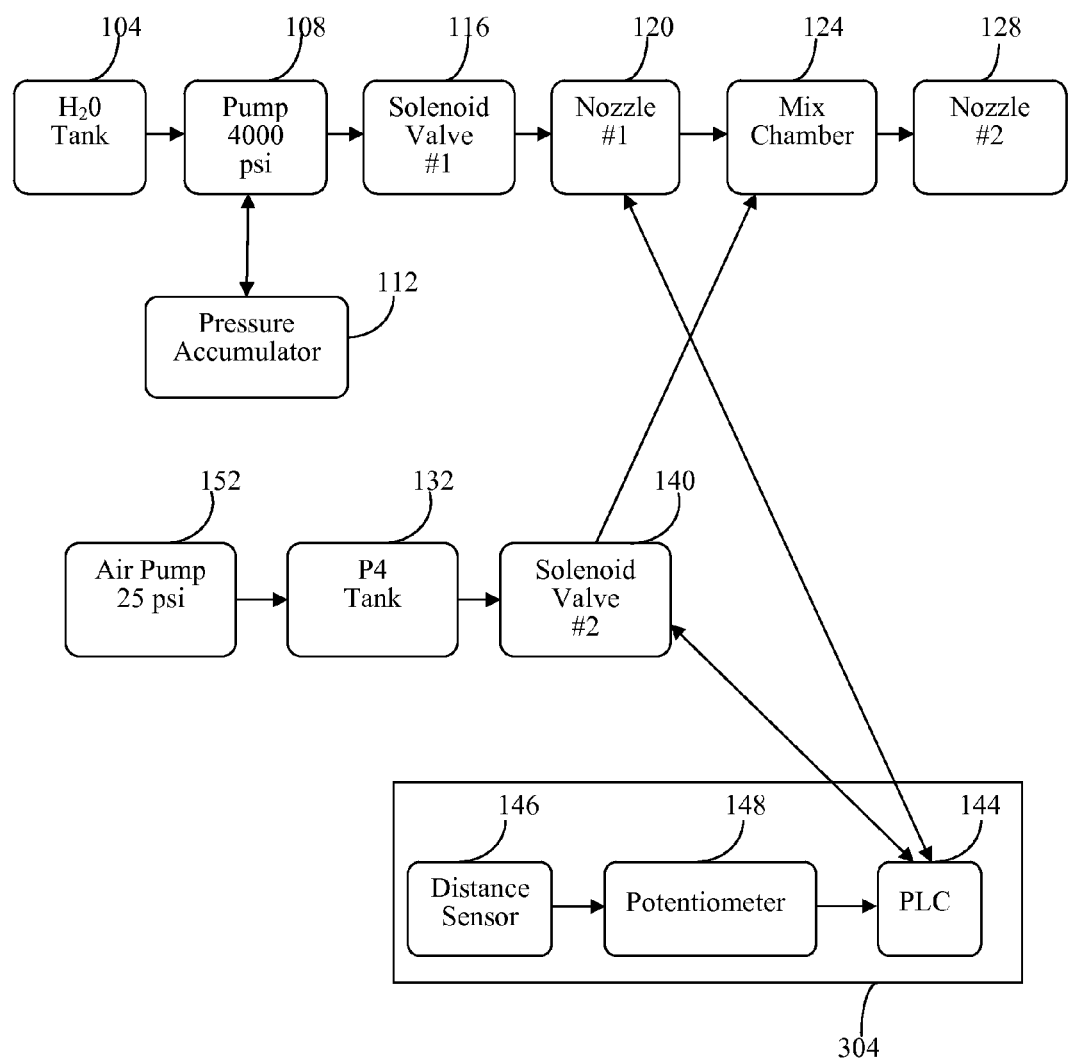
FIG. 3 illustrates another embodiment of the apparatus for forming holes in ground and for directing hygroscopic particles into the holes.

FIG. 1 is a block diagram of an apparatus 100 for forming holes in ground and for directing hygroscopic particles into the holes in accordance with one implementation. The apparatus 100 includes a first supply tank 104 for supplying a liquid such as water. A pump 108 transfers the water from the first supply tank 104 to a first valve 116. In one implementation, a pressure mechanism such as a pressure accumulator 112 in concert with the pump 108 maintains the water at a desired pressure level. In one implementation, the water is maintained at 4000 PSI.

The first valve 116 regulates the delivery of the pressurized water from the pump 108 to one or more openings 120. The openings 120 may be orifices, injection heads, nozzles or other equivalent means. In one implementation, the openings 120 are spaced injection heads 120. The injection heads 120 direct jets of water into the ground to form holes.

In one implementation, the first valve 116 is a solenoid valve activated by an electrical signal. It will be apparent that the first valve 116 may be controlled by other known methods.

In another implementation, the first valve 116 transfers the water into the injection head 120. The injection head 120 delivers pressurized water to a chamber 124. The water is subsequently transferred from the chamber 124 to an injection head 128. The injection head 128 directs jets of pressurized water into the ground to form the holes.

In one implementation, the first valve 116 and the injection head 120 are advantageously used to regulate the thrust of the jets of water into the ground in order to form holes of desired depth. Depending on soil condition, the depth of the holes may be adjusted. If for example, the soil is of clay-type, the activation period (i.e., ON period) of the first valve 116 may be prolonged to increase the depth of the holes.

The apparatus 100 includes a second supply tank 132 for supplying hygroscopic particles. In one implementation, the second supply tank 132 may hold Polyaerylamide (P4) or other hygroscopic substances in a particle form or other suitable form. A pump 152 connected to the tank 132 facilitates delivery of the particles from the tank 132 to a second valve 140. Appropriate amounts of water may be added to the hygroscopic particles in the tank 132.

The second valve 140 regulates the delivery of the hygroscopic particles to the mixing chamber 124. In one implementation, the second valve 140 is a solenoid valve activated by an electrical signal. The second valve 140 may be implemented in other manners as will be understood by those skilled in the art.

The second valve 140 is used to regulate the amount of hygroscopic particles delivered to the chamber 124. The activation time (i.e., ON time) of the second valve 140 may be set to deliver a desired amount of the hygroscopic particles into the chamber 124. Depending on the soil condition, the amount of hygroscopic particles delivered to the holes may be controlled.

After the hygroscopic particles are delivered into the chamber 124, the first valve 116 is activated again to force pressurized water from the pump 108 into the chamber 124. Consequently, the hygroscopic particles are forced into the injection head 128, which directs jets of hygroscopic particles into the holes.

Thus, it will be appreciated that the first valve 116 is activated for a first time period T1 to form the holes in the ground. By adjusting the first time period T1, the depth of the holes can be adjusted. Thereafter, the second valve 140 is activated for a second time period T2 to deliver a desired amount of the hygroscopic particles to the chamber 124. The amount of the hygroscopic particles delivered to the holes can be controlled by adjusting the second time period T2. Finally, the first valve 116 is activated for a third time period T3 to force the hygroscopic particles into the injection heads 128, which direct jets of hygroscopic particles into the holes formed.

It will be appreciated that the apparatus 100 enables a user to form the holes having a desired depth by controlling first valve 116, and further enables the user to deliver a desired amount of the hygroscopic particles into the holes by controlling the second valve 140.

In another embodiment, during activation of the first valve 116 during the first time period T1, the water from the injection heads 120 may be used directly to form the holes, bypassing the chamber 124 and the injection heads 128. However, during the activation of the first valve 116 during the third time period T3, the water from the injection heads 120 will be directed into the chamber 124 to force the hygroscopic particles into the injection heads 128. It will be apparent that such an embodiment will require modifications to the apparatus 100 to enable the water to bypass the chamber 124 during the first time period T1 (i.e., during the holes forming phase) but to enter the chamber 124 during the third time period T3 in order to direct the hygroscopic particles into the holes.

Other variations and modifications will be apparent to those skilled in the art.

In one embodiment, the injection head 120, the chamber 124 and the injection head 128 may be implemented as a cylindrical assembly 200 shown in FIG. 2. As shown in FIG. 2, the cylindrical assembly 200 includes a chamber 124. The injection head 120 is positioned inside the chamber 124 and is configured to direct jets of water into the chamber 124. A tube 202 attached to the cylindrical assembly 200 supplies pressurized water from the valve 116 to the injection head 120. During the first time period T1, the injection head 120 allows the pressurized water from the valve 116 to enter the chamber 124. The water exits the chamber 124 through the injection head 128 to form holes in the ground.

During the second time period T2, a tube 204 attached to the chamber 124 delivers the hygroscopic particles into the chamber 124. The hygroscopic particles remain inside the chamber 124 until the third time period T3 during which pressurized water from the injection head 120 forces the hygroscopic particles to exit the chamber 124 through the injection head 128.

In one implementation, the first and second valves 116 and 140 are controlled by a control system 304 illustrated in FIG. 3. The control system 304 may be configured to receive distance information from a distance sensor 146 as the apparatus 100 moves along a selected path, and in response generate various control signals for operating the valves and the nozzles. The control system 304 is configured to control the activation time (e.g., T1, T2 and T3) of the first and second valves 116 and 140 based on soil condition.

As discussed before, the activation times of the first and second valves may be prolonged or reduced depending on soil condition (e.g., sandy, clay, rock, etc.). It will be appreciated that the apparatus 100 may include a plurality of injection heads 120 and a plurality of injection heads 128. By incorporating a plurality of injection heads 120 and 128, the hygroscopic particles will be added to the ground at a faster rate.

In one implementation, the control system is configured to also control the injection heads 120 and 128. For example, depending on soil condition, the control system 304 may fire only a selected number of injection heads 120 and 128. Thus, if soil condition warrants large amounts of water, all of the injection heads or nozzles may be activated, thereby maximizing the application of hygroscopic particles. On the other hand, sandy soil condition may require less water, which allows the control system to deactivate some injection heads or nozzles, thereby decreasing the amount of hygroscopic particles into the holes.

The control system 304 includes a programmable logic controller 144, which responsive to distance information generates first and second control signals to control the respective valves 116 and 140. The apparatus 100 may include a potentiometer 148, which receives the distance information from a distance sensor 146, and in response applies a third signal to the programmable logic controller 144. In response, the programmable logic controller 144 generates the first and second control signals. The first and second control signals cause the jets to discharge from the nozzles (injection heads) at predetermined spaced intervals.

In one implementation, a metering mechanism may be incorporated to the apparatus 100 to precisely meter the amount of hygroscopic particles delivered to the holes. For example, the metering mechanism may precisely control the amount of hygroscopic particles transferred from the second supply tank 132 to the chamber 124. In one implementation, depending on soil conditions, the second control signal adjusts the activation times of the second valve 140 and the metering mechanism to precisely control the amount of hygroscopic particles delivered to the ground.

As discussed, the hygroscopic particles release water to the soil over an extended period of time. The hygroscopic particles also absorb rain water from the soil and retain the water over an extended period of time. During dry conditions, the hygroscopic particles release the water back into the soil, thus maintaining moisture level in the soil.

Thus, it will be appreciated that the first valve 116 is activated during the first time period T1 to drill holes in the ground. The second valve 140 is next activated during the second time period T2 to load the hygroscopic particles into the chamber 124. Next, the first valve 116 is activated again during the time period T3 to force the hygroscopic particles into the holes. The foregoing cycle is repeated as the apparatus 100 moves along a path. Also, it will be appreciated that the apparatus 100 will preferably have a plurality of first injection heads 120 and a plurality of second injection heads 128.

By varying the frequency of activation of the first valve 116, the number of holes may be varied. Thus, for example, the first valve 116 may be activated at a predetermined frequency to form holes that are, for example, 3 inches apart. Also, by varying the activation period of the first valve 116, the depth of the holes can be varied. Thus, depending on the soil condition, the activation time of the first valve 116 may be adjusted to vary the depth. By varying the activation period of the second valve 140, the amount of hygroscopic particles dispensed is varied.

In one implementation, the apparatus 100 may be embodied in a self propelled machine. The apparatus 100 may also be embodied in a push-type or a pull-type machine. The apparatus 100 may be installed in a machine, which allows the operator to walk along the machine to control its operation. Alternatively, the machine may be configured to allow the operator to ride the machine and control its movements.

It will also be appreciated that one or more of the elements depicted in the drawings/figures can also be implemented in a more separated or integrated manner, or even removed or rendered as inoperable in certain cases, as is useful in accordance with a particular application.

As used in the description herein and throughout the claims that follow, "a", "an," and "the" include plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in the following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. An apparatus for forming holes in ground and for placing hygroscopic particles into the holes, comprising:
    a first chamber configured to hold a liquid;
    a second chamber configured to hold the hygroscopic particles;
    a first pressure mechanism operable to maintain the liquid in the first chamber at a first pressure level;
    a second pressure mechanism operable to maintain the hygroscopic particles in the second chamber at a second pressure level;
    a first valve operable during a first time period to regulate the delivery of the liquid into a third chamber through a first opening;
    a second opening configured to direct jets of liquid from the third chamber during the first time period to form holes in the ground;
    a second valve operable during a second time period to regulate the delivery of the hygroscopic particles to the third chamber; and
    the first valve operable during a third time period to regulate the delivery of the liquid to the third chamber through the first opening causing jets of the hygroscopic particles to be directed through the second opening into the holes; and
    a control system configured to receive a distance information and in response operable to cause the first valve to regulate the delivery of the liquid into the third chamber and to cause the second valve to regulate the delivery of the hygroscopic particles into the third chamber, wherein the control system comprises a programmable logic controller operable responsive to the distance information to generate first and second control signals to control the respective first and second valves.

2. The apparatus of claim 1, wherein the first opening is an injection head.

3. The apparatus of claim 1, wherein the second opening is an injection head.

4. The apparatus of claim 1, further comprising a sensor operable to provide distance information to the control system as the apparatus traverses the ground in a path.

5. The apparatus of claim 1, wherein the first and second valves are solenoid activated valves.

6. The apparatus of claim 1, wherein the first pressure mechanism comprises a pressure accumulator operable to deliver the liquid at the first pressure level into the first valve.

7. The apparatus of claim 1, wherein the control system is operable to regulate the duration of the jets of hygroscopic particles.

8. The apparatus of claim 1, wherein the control system is operable to regulate the duration of the jets of liquid.

9. The apparatus of claim 1, wherein the hygroscopic particles are water retaining particles.

10. The apparatus of claim 1, wherein the injection heads alternatively direct the jets of hygroscopic particles and liquid.

* * * * *